340-870.14 SR

XR 3,491,338

SYSTEM FOR SYNCHRONIZING A RECEIVER AND TRANSMITTER AT OPPOSITE ENDS OF A TRANSMISSION PATH AND FOR EVALUATING THE NOISE LEVEL THEREOF

Filed April 17, 1967 7 Sheets-Sheet 1

INVENTOR.
FRANCIS W. MALLOY
BY Harry A. Herbert Jr
Julian L. Siegel
ATTORNEYS

3491338
OR IN 340/146.1D

INVENTOR.
FRANCIS W. MALLOY
BY Harry A. Herbert Jr. and Julian L. Siegel
ATTORNEYS SYSTEM FOR SYNCHRONIZING A RECEIVER AND TRANSMITTER AT OPPOSITE ENDS OF A TRANSMISSION PATH AND FOR EVALUATING THE NOISE LEVEL THEREOF Filed April 17, 1967 7 Sheets-Sheet 3

INVENTOR.
FRANCIS W. MALLOY
BY Harry A. Herbert Jr. and Julian L. Siegel
ATTORNEYS Jan. 20, 1970 F. W. MALLOY 3,491,338

SYSTEM FOR SYNCHRONIZING A RECEIVER AND TRANSMITTER AT OPPOSITE ENDS OF A TRANSMISSION PATH AND FOR EVALUATING THE NOISE LEVEL THEREOF

Filed April 17, 1967 7 Sheets-Sheet 4

INVENTOR.
FRANCIS W. MALLOY
BY Harry A. Herbert Jr. and Julian L. Siegel
ATTORNEYS Jan. 20, 1970 F. W. MALLOY 3,491,338

SYSTEM FOR SYNCHRONIZING A RECEIVER AND TRANSMITTER AT OPPOSITE ENDS OF A TRANSMISSION PATH AND FOR EVALUATING THE NOISE LEVEL THEREOF

Filed April 17, 1967 7 Sheets-Sheet 5

INVENTOR.
FRANCIS W. MALLOY
BY Harry A. Herbert Jr and Julian L. Siegel
ATTORNEYS Jan. 20, 1970 F. W. MALLOY 3,491,338

SYSTEM FOR SYNCHRONIZING A RECEIVER AND TRANSMITTER AT OPPOSITE ENDS OF A TRANSMISSION PATH AND FOR EVALUATING THE NOISE LEVEL THEREOF

Filed April 17, 1967 7 Sheets-Sheet 6

INVENTOR.
FRANCIS W. MALLOY
BY Harry A. Herbert Jr.
and Julian L. Siegel
ATTORNEYS Jan. 20, 1970 F. W. MALLOY 3,491,338

SYSTEM FOR SYNCHRONIZING A RECEIVER AND TRANSMITTER AT OPPOSITE ENDS OF A TRANSMISSION PATH AND FOR EVALUATING THE NOISE LEVEL THEREOF

Filed April 17, 1967 7 Sheets-Sheet 7

INVENTOR.
FRANCIS W. MALLOY
BY Harry A. Herbert Jr. and Julian L. Siegel
ATTORNEYS United States Patent Office 3,491,338
Patented Jan. 20, 1970

3,491,338

SYSTEM FOR SYNCHRONIZING A RECEIVER AND TRANSMITTER AT OPPOSITE ENDS OF A TRANSMISSION PATH AND FOR EVALUATING THE NOISE LEVEL THEREOF

Francis W. Malloy, Wayland, Mass., assignor to the United States of America as represented by the Secretary of the Air Force Filed Apr. 17, 1967, Ser. No. 632,160
Int. Cl. G08b *29/00, 1/00;* G06f *11/00*
U.S. Cl. 340—146.1 4 Claims

ABSTRACT OF THE DISCLOSURE

A communication synchronizing and testing system for producing a series of synchronizing pulses and automatically followed by a series of test pulses formed by a flip-flop chain and a matrix network which feed the test pulses to a shift register which is controlled by a shift generator acting as a delay circuit. The output of the shift register is fed to an evaluator unit and if there are minimum errors, a GO signal is generated.

This invention relates to communications, and more particularly to the synchronization and testing of transmission between two stations.

This invention fills the need for very reliable long-range communications between aircraft and ground stations. Conventional high frequency propagation has been plagued with absorption difficulties resulting in radio blackout in the auroral belt of the northern regions of this continent (aurora borealis), and noise largely caused by magnetic radiation.

The invention is an electronic device designed to perform three functions necessary for the proper operation of electronic units such as timing units and converters associated with the two stations, such as one land-based and the other airborne, involved in the transmission. It first produces a baud synchronizing signal which synchronizes the transmitter and receiver timing units in each leg of the system, of which there are four; one at the ground transmitter, one at the ground receiver, and one each with the airborne transmitter and receiver.

Its second function is to produce a multi-digit preamble in predetermined patterns of ones (1's) and zeros (0's).

Third, when this preamble is stored and then processed by an evaluator unit, an enabling voltage is produced or, under certain conditions, is not produced. This enabling voltage results in a GO signal which places the transmitter in a readiness to process the data supplied to it from a teletypewriter or other source of information by activating the ring counters of the converters or other circuitry.

It is therefore an object of the invention to provide reliable synchronization between two widely separated communication stations.

It is another object to provide a system for evaluating the transmission path between two stations to determine whether the noise level is sufficiently low to permit reliable communications.

The above and still other objects, advantages and features of my invention will become apparent upon consideration of the following detailed description taken in connection with the illustrative embodiments in the accompanying drawings, wherein.

Figure 1:
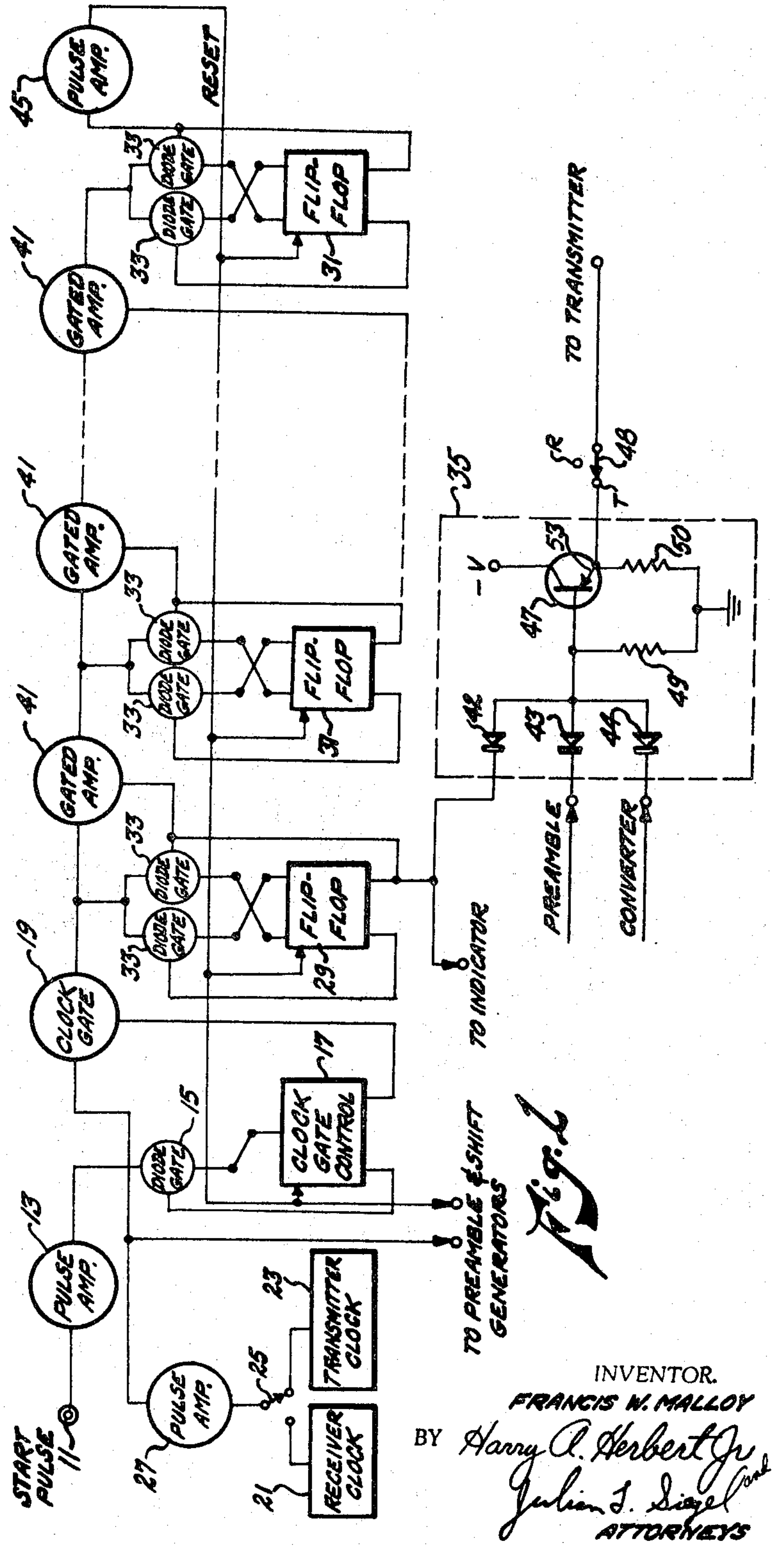
FIG. 1 is a block diagram of the baud sync generator with a circuit of a three-input OR gate.
Figure 2:
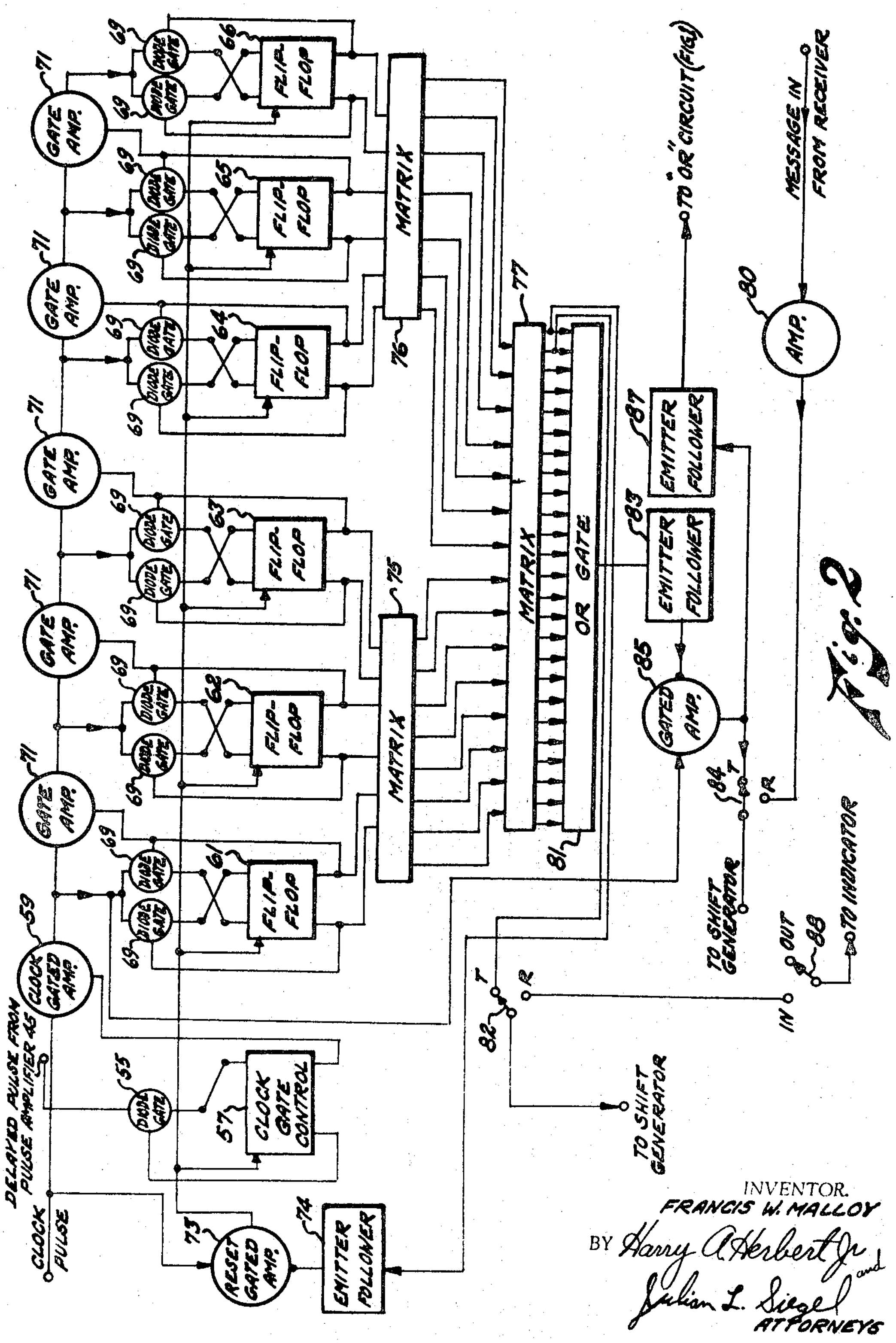
FIG. 2 is a block diagram of the preamble generator.
Figure 3:
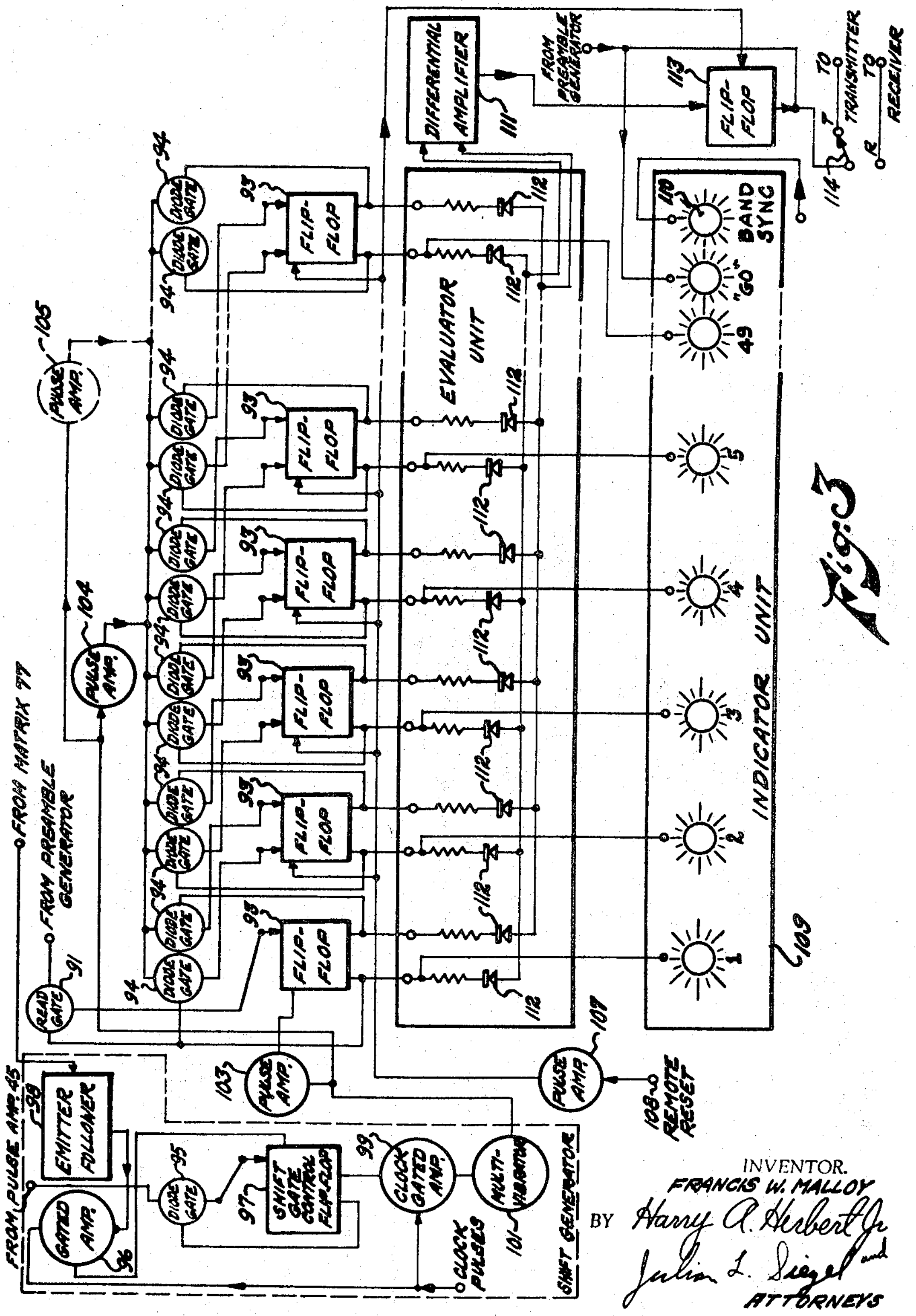
FIG. 3 is a block diagram of the shift register and shift generator with the indicators.

The generation of a synchronization signal for the transmission to the remote receiver site is a first function of this invention. Referring to FIG. 1, start pulse 11 is generated at the control console and amplified by pulse amplifier 13. This pulse triggers clock gate control flip-flop 17 which enables gated amplifier 19 into the set state via diode gate 15. Baud clock pulses may be supplied from either receiver baud clock generator 21 or transmitter baud clock generator 23 as controlled by switch 25 which is one section of the transmit-receive switch. Baud clock generators 21 and 23 can be standard multivibrators and are commercially and readily available. The clock pulses are amplified by pulse amplifier 27 and are passed by gated amplifier 19 to the first flip-flop stage 29 of the baud sync generator. An output is taken from one side of flip-flop 29 and connected to one input of triple input OR gate 35. OR gate 35 comprises diodes 42, 43 and 44, transistor 47 and resistors 49 and 50. The output of OR gate 35 which is sent to the transmitter is taken from emitter 53. Visual indication of baud sync generator is given by flashing light 110 on the panel of indicator unit 109 (FIG. 3). The remaining flip-flops collectively designated as 31 in the chain are used to produce a predetermined delay. Pulses to the flip-flop are gated by gated amplifiers 41 and are steered by diode gates 33. A pulse delayed for a predetermined time from the start pulse is taken from final pulse amplifier 45. This pulse performs three functions: (1) it triggers clock gate control 17 into its reset state, thus inhibiting gated amplifier 19 which cuts off the baud clock pulse train used as a synchronizing signal. By this means a synchronizing pulse train for the predetermined timed at the baud clock rate is generated for transmission to the remote receiver site; (2) as shown in FIG. 2, clock gate control 57 is triggered into its set state via diode gate 55; and (3) the pulse delayed for a predetermined time triggers the shift gate control flip-flop 97 into its set state via diode gate 95 shown in FIG. 3. Flip-flop 97 is a component of the shift generator which will later be fully explained.

The second function of the invention is to generate a multi-digit pulse train which is called a preamble. In the embodiment the invention is explained using a 49-digit pulse train. This preamble, which was the result of intensive research and calculation, is virtually impossible to reproduce accidentally as, for example, by excessive and erratic noise in the transmission path between the ground and the aircraft.

Figure 5:
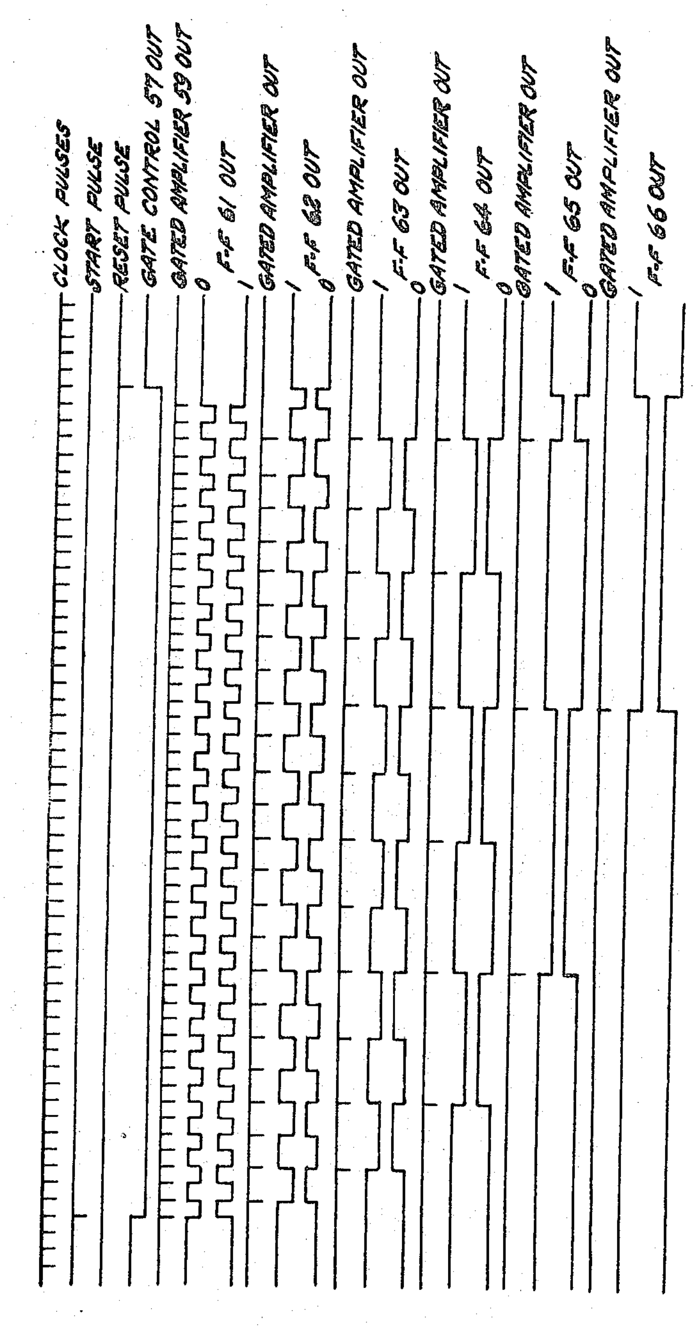
FIGS. 5–7 are waveform diagrams useful in the explanation of the invention.

Referring to FIG. 2, when the system is in the transmit mode and the delayed pulse from pulse amplifier 45 triggers clock gate control 57 into the set state via diode gate 55, clock gate amplifier 59 is enabled and baud clock pulses are passed on to the flip-flop chain of the preamble generator which comprises flip-flops 61–66 and their associated diode gates 69 and gated amplifiers 71. Clock gate control 57 can be a standard flip-flop module which is commercially and readily available. The flip-flop chain is a six-stage counter which counts sequentially to binary 64 and is then reset by pulse from reset gated amplifier 73. The output waveforms from each of the six stages are standard counter waveforms and are shown on the timing diagram of FIG. 5. Both the zero and one outputs of the first three flip-flop stages 61–63 of the counter are connected to the input of matrix 75 and the outputs of the last three flip-flops 64–66 are connected to the inputs of matrix 76.

Figure 4:
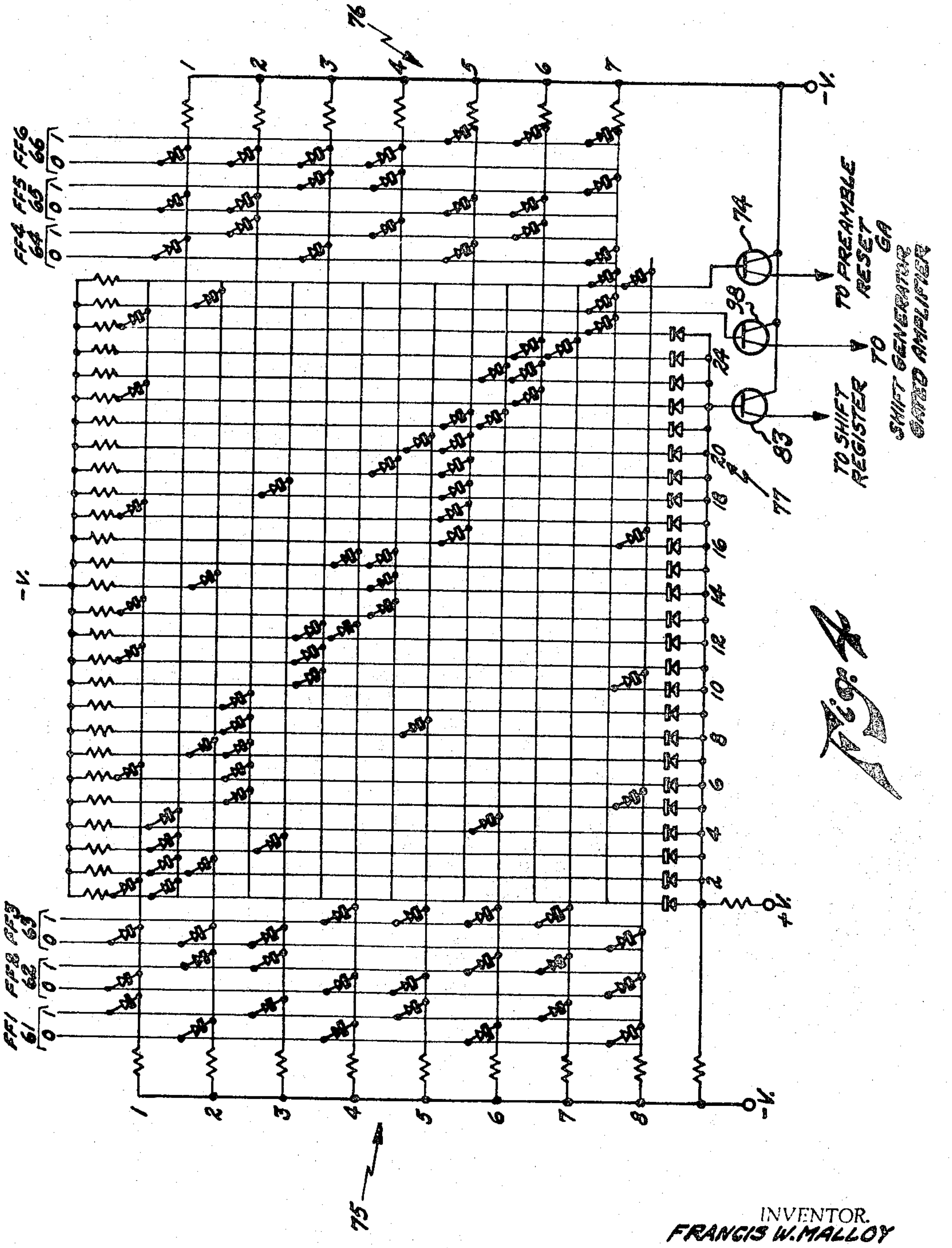
FIG. 4 is a matrix diagram showing the details of the matrices of FIG. 2.
Figure 6:
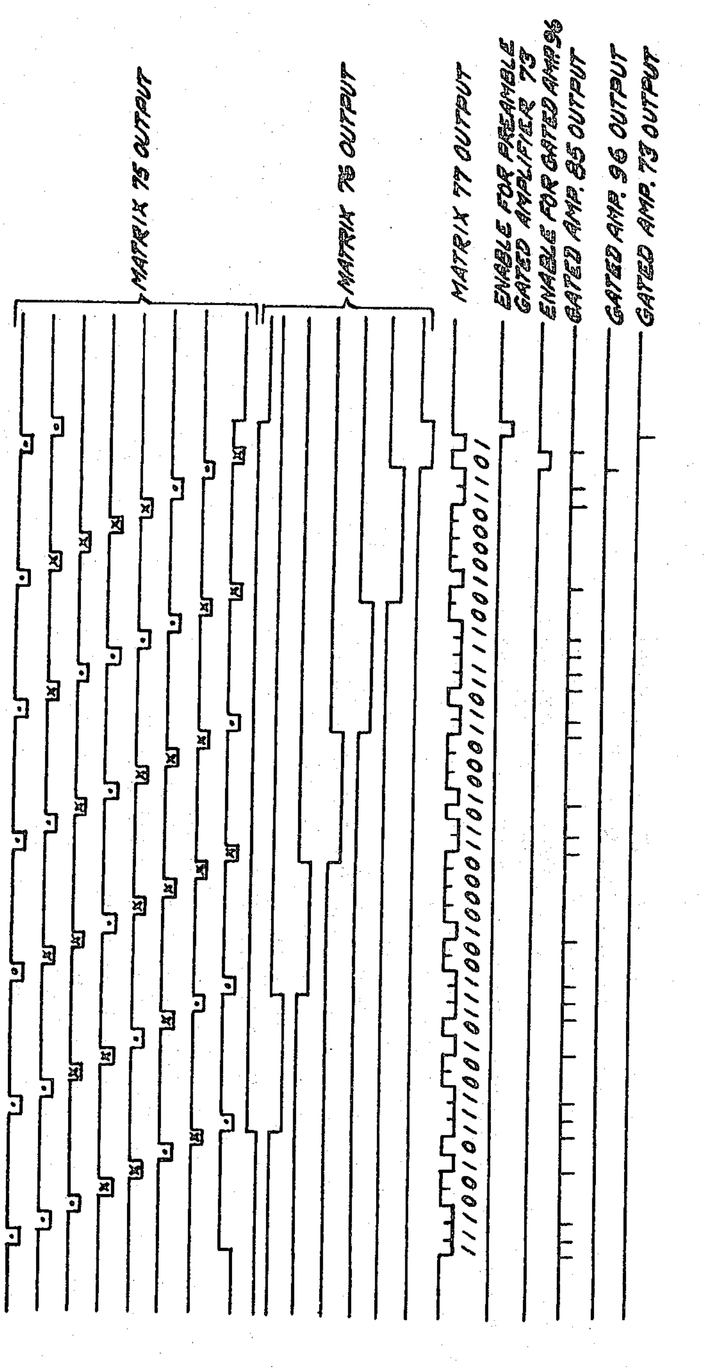

Referring to FIG. 4 which shows the details of the matrices, matrix 75 is a 6 x 8 (6 inputs-eight outputs) rectangular minimal design matrix switch which is controlled by the zero and one outputs of flip-flops 61–63 of the six-stage binary counter of the preamble generator. Each of the 8 legs of matrix 75 is a triple input AND gate performing a logical AND function in response to stimuli from the logical one and logical zero outputs of the associated flip-flops. When all three inputs of any one of the eight AND gates comprising matrix 75 are high, that is, energized by a logical one, the output of the gate is high. If any of the three inputs of a gate are energized by a logical zero, the output of that gate is low. If negative logic is employed, a high or logical one is defined by a negative voltage and constitutes an enable level or trigger depending on the use to which it is put. A low is defined as ground and constitutes an inhibit or disable level or a no-trigger, again depending on the use to which it is put. As used in this system, the output of matrices 75 and 76 are in either enable levels or inhibit levels for matrix 77. Matrix 76 is exactly the same type as matrix 75 except that it has only 7 outputs. It is also a rectangular minimal design matrix which has 15 inputs, 8 from matrix 75 and 7 from matrix 76, and has 25 outputs. Each of the 25 legs of the matrix 77 is a dual input AND gate. One of the two inputs of any of the gates is energized by an output from matrix 75 and the other input is energized from an output from matrix 76. Coincidence at a gate, that is, when both inputs of that gate are high, produces an output. As an example, when output 1 of matrix 75 and output 1 of matrix 76 are both high, the two inputs of the dual input of AND gate of leg 1 of matrix 77 are enabled coincidentally and an output results. This output represents the first one digit of the preamble. At leg 2 of matrix 77 there is coincidence between output 1 of matrix 76 and output 2 of matrix 75, producing the second 1 digit of the preamble. The third 1 digit results from coincidence between output 1 of matrix 76 and output 3 of matrix 75. The fourth digit of the preamble is a zero and results from the anti-coincidence between output 1 of matrix 76 and output 6 of matrix 75. In this manner the remaining digits of the preamble are produced in a predetermined sequence. Reference to the timing diagram of FIG. 6 will facilitate understanding of the logic used to produce the desired 49-digit preamble. An output of matrix 77 is fed to the shift register through switch 82, a section of the transmit-receive switch. Another output is fed to reset gated amplifier 73 via emitter follower 74.

The rectangular waveform of matrix 77 output is coupled via OR gate 81 through an emitter follower 83 to the gain level input of gated amplifier 85. The pulse input to gated amplifier 85 is baud clock pulses and the output is the coded preamble of the system. The preamble is then fed to emitter follower 87 which is coupled to one input of triple input OR circuit 35 (FIG. 1).

The second leg of the dual output of gated amplifier 85 is connected to selector switch 84 (a section of the transmit-receive switch). When the system is in the transmit mode the preamble as shown in FIG. 3 is coupled through read gate 91 to the pulse input of flip-flop 93 via diode gates 94 which are stages of a 49-stage shift register.

Figure 7:
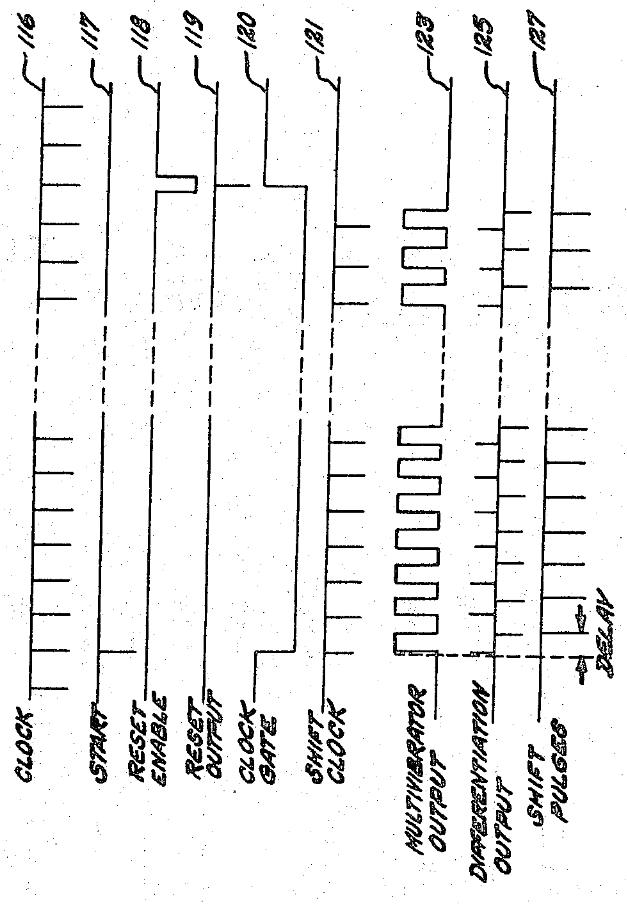

The third function, as previously mentioned, of the pulse delayed for a predetermined time and emanating from pulse amplifier 45 is to trigger the shift generator. The pulse triggers shift gate control 97 into the set state via diode gate 95, thus enabling shift clock gated amplifier 99 which then passes shift pulses via shift multivibrator 101 and pulse amplifiers 103 to 105 to the shift pulse input of the first stage of the shift register. The shift generator starts simultaneously with the preamble generator. Referring to the waveform diagram of FIG. 7, clock pulses shown at 121 gated through clock gated amplifier 99 trigger monostable multivibrator 101 producing rectangular wave shown at 123. This is differentiated producing the wave 125 and the wave shown at 127 is produced. Differentiation of rectangular pulses 123 can be accomplished by pulse amplifier 103–105 which, being edge sensitive, produces a sharp pulse for each edge either positive going or negative going of the rectangular pulses that produce it. This system provides a delay circuit in which clock pulses are delayed. After amplification, the delayed pulse train is used as a shift pulse train for the shift register. An enable signal shown at 118 is taken from matrix 77 and used to gate a pulse shown at 119 through shift reset gated amplifier 96 via emitter follower 98. This pulse is the reset for the shift register. The coded preamble is then inserted serially into the shift register until each preamble stage contains one digit of the 49-digit preamble. The preamble will remain stored in the shift register indefinitely until the shift register is cleared by activating remote reset 108 on the control console which is amplified by reset pulse amplifier 107. Visual indication of the stored preamble is given by lights on indicator panel 109.

If the stored preamble is error-free and no errors are allowed in the preamble in the transmit mode for properly functioning equipment, the evaluator unit which samples the waves of each of the 98 pulses from the shift register generates a pluse designated as a GO pulse of the system through enable/disable flip-flop 113. The evaluator unit consists of OR gates 112 and differential amplifier 111 which is conventional in the art. Forty-nine (49) of the OR gates are connected to the logical one output of the shift register, and 49 are connected to the logical zero outputs. The gates function as summing circuits, summing up voltages of the one and zero outputs separately. The resultant voltage levels of the one and zero pulses act as bias voltages applied to differential amplifier 111. Since the output of a differential amplifier is proportional to the difference between the voltage levels applied to the two inputs, that is, $E_{out}=K(E_0-E_1)$ an error occurring in the preamble will cause a reduction in the output level of the amplifier. The bias control can be so set that when more than a given number of errors, such as three, are present in the preamble, the amplitude of the output pulse of the differential amplifier is too low to activate enable/disable flip-flop 113. This constitutes a NO-GO signal and the converter or other circuitry will not receive or transmit a message depending on the position of switch 114 (a section of the transmit-receive switch) under these conditions. When fewer than the allowed errors are present in the preamble, the amplitude of the output pulse of the differential amplifier is sufficiently high to activate flip-flop 113 causing it to change states, applying an enable level to an AND gate in the converter or other circuitry. This constitutes a GO signal and the converter will either transmit a message or receive one, depending upon which mode this system is in.

The system can be switched to the receive mode with the transmit-receive switch which is a ganged switch comprising sections 25, 48, 82, and 84. When the transmit-receive switch is in the receive mode, the incoming message from a remote site which comprises a burst of baud sync pulses for a predetermined time followed by the preamble and then by the message proper is coupled to the input of the first shift register stage. The instant that all 49 digits of the preamble are stored in the shift register, a GO pulse will be generated or not generated, depending on the number of errors received in the preamble. Switch 88 is a preamble stop switch and is used when the transmit-receive switch is in the receive position.

I claim:

1. A system for testing communications conditions between two stations comprising:
   (a) a source of clock pulses;
   (b) a preamble counter including a series of flip-flops with each flip-flop having a pair of complementary outputs, the preamble counter being pulsed by the source of clock pulses;
   (c) means for starting the preamble counter;
   (d) a diode matrix system having a plurality of outputs and a plurality of inputs, one each of the inputs connected to each of the plurality of outputs of the preamble counter for selecting a predetermined sequence of binary output values;

(e) an OR gate circuit fed by the plurality of outputs of the diode matrix system;

(f) a shift register having multiple outputs and fed by the OR gate circuit;

(g) means for pulsing the shift register;

(h) means for evaluating the outputs of the shift register;

(i) and means for producing a GO signal fed by the evaluating means.

2. A system for synchronizing and evaluating communications conditions between two stations comprising:

(a) a source of clock pulses;

(b) synchronizing means for generating synchronizing pulses at one station for transmission to the other station for a predetermined time, the synchronizing means being pulsed by the source of clock pulses;

(c) means for starting the synchronizing means;

(d) a preamble counter including a series of flip-flops with each flip-flop having a pair of complementary outputs, the preamble counter being pulsed by the source of clock pulses;

(e) means for starting the preamble counter;

(f) a diode matrix network having a plurality of outputs and a plurality of inputs, one each of the inputs connected to each of the plurality of outputs of the preamble counter for selecting a predetermined sequence of binary output values;

(g) an OR gate circuit fed by the plurality of outputs of the diode matrix network;

(h) a shift register having multiple outputs fed by the OR gate circuit and activated by the source of clock pulses;

(i) means for pulsing the shift register;

(j) means for evaluating the outputs of the shift register;

(k) and means for producing a GO signal fed by the evaluating means.

3. A synchronizing and evaluating system according to claim 2 wherein the synchronizing means comprise:

(a) a starting signal source;

(b) a control flip-flop having set and reset outputs triggered by the starting signal source;

(c) a synchronizing gated amplifier fed by the source of clock pulses and the set output of the control flip-flop, the gated amplifier having a pulsed output;

(d) a second flip-flop complementarily triggered by the gated amplifier, the output of the second flip-flop being a synchronizing signal;

(e) and a series of delay flip-flops connected to the output of the second flip-flop, the output of the last of the plurality of delay flip-flops being fed to the control flip-flop for triggering to the reset state thereof and inhibiting the first gated amplifier.

4. A synchronizing and evaluating system according to claim 2 wherein the means for pulsing the shift register comprise:

(a) a first shift gated amplifier fed by the source of clock pulses and one output of the matrix network;

(b) a shift flip-flop triggered by the first shift gated amplifier;

(c) a second shift gated amplifier fed by the source of clock pulses and the output of the shift flip-flop;

(d) a monostable multivibrator triggered by the second shift gated amplifier;

(e) and an edge sensitive pulse amplifier fed by the monostable multivibrator, the output of the edge sensitive pulse amplifier being fed to the shift register.

References Cited

UNITED STATES PATENTS

| | | | |
|---|---|---|---|
| 3,069,498 | 12/1962 | Frank | 178—69 |
| 3,252,139 | 5/1966 | Moore | 340—146.1 |

MALCOLM A. MORRISON, Primary Examiner

R. S. DILDINE, Jr., Assistant Examiner

U.S. Cl. X.R.

178—69.5; 325—41; 340—203, 309.4; 343—179